United States Patent
Appel (10) Patent No.: US 10,677,760 B2
(45) Date of Patent: Jun. 9, 2020

(54) METHOD FOR THE ULTRASONIC MICROSCOPIC MEASUREMENT OF SEMICONDUCTOR SAMPLES, COMPUTER PROGRAM FOR THE ULTRASONIC MICROSCOPIC MEASUREMENT OF SEMICONDUCTOR SAMPLES, COMPUTER PROGRAM PRODUCT AND ULTRASOUND MICROSCOPE

(71) Applicant: OSRAM OLED GMBH, Regensburg (DE)

(72) Inventor: Helmut Appel, Ammerthal (DE)

(73) Assignee: OSRAM OLED GMBH, Regensburg (DE)

( * ) Notice: Subject to any disclaimer, the term of this patent is extended or adjusted under 35 U.S.C. 154(b) by 331 days.

(21) Appl. No.: 15/788,717

(22) Filed: Oct. 19, 2017

(65) Prior Publication Data
US 2018/0113096 A1    Apr. 26, 2018

(30) Foreign Application Priority Data

Oct. 20, 2016 (DE) .................. 10 2016 120 024
Dec. 20, 2016 (DE) .................. 10 2016 125 016

(51) Int. Cl.
| | | |
|---|---|---|
| G01N 29/06 | (2006.01) | |
| G01N 29/44 | (2006.01) | |
| G01N 29/07 | (2006.01) | |
| G01N 29/265 | (2006.01) | |

(52) U.S. Cl.
CPC ..... *G01N 29/0681* (2013.01); *G01N 29/0645* (2013.01); *G01N 29/07* (2013.01); *G01N 29/265* (2013.01); *G01N 29/44* (2013.01); *G01N 29/4436* (2013.01); *G01N 29/4454* (2013.01)

(58) Field of Classification Search
CPC .......... G01N 29/4436; G01N 29/4454; G01N 29/0645
See application file for complete search history.

(56) References Cited

U.S. PATENT DOCUMENTS

| | | | | |
|---|---|---|---|---|
| 9,069,227 | B2* | 6/2015 | Kirkby | G02B 21/0024 |
| 2013/0116564 | A1* | 5/2013 | Katsuyama | A61B 8/469 |
| | | | | 600/442 |
| 2013/0123628 | A1* | 5/2013 | Katsuyama | A61B 6/469 |
| | | | | 600/442 |
| 2014/0360273 | A1* | 12/2014 | Zhang | G01N 29/0681 |
| | | | | 73/643 |
| 2015/0233811 | A1* | 8/2015 | Strohm | G01N 15/14 |
| | | | | 73/601 |
| 2016/0262727 | A1* | 9/2016 | Dayton | A61B 8/4477 |

FOREIGN PATENT DOCUMENTS

| | | |
|---|---|---|
| DE | 4138328 A1 | 5/1992 |
| DE | 102008042709 A1 | 6/2009 |
| DE | 102009031157 A1 | 7/2010 |

* cited by examiner

*Primary Examiner* — Alvaro E Fortich
(74) *Attorney, Agent, or Firm* — MH2 Technology Law Group, LLP (57) ABSTRACT

Method for ultrasound microscopic measuring of semiconductor samples, computer program for ultrasound microscopic measuring of semiconductor samples, computer program product and ultrasound microscope. Inter alia, a method for the ultrasound microscopic measurement of semiconductor samples is provided, in which the time distances ($\Delta t$) between signals are compared with comparative time distances, which are determined by a known thickness of a layer of the sample.

18 Claims, 3 Drawing Sheets

METHOD FOR THE ULTRASONIC MICROSCOPIC MEASUREMENT OF SEMICONDUCTOR SAMPLES, COMPUTER PROGRAM FOR THE ULTRASONIC MICROSCOPIC MEASUREMENT OF SEMICONDUCTOR SAMPLES, COMPUTER PROGRAM PRODUCT AND ULTRASOUND MICROSCOPE

This application claims the priorities of the German patent applications DE 10 2016 125016.3 and DE 10 2016 120024.7, which are hereby incorporated by reference.

The invention relates to a method for the ultrasound microscopic measuring of semiconductor samples, a computer program for the ultrasound microscopic measuring of semiconductor samples, a computer program product, and an ultrasound microscope.

Acoustic microscopy or ultrasound microscopy refers to an imaging method, which utilizes density waves in the acoustic range of 20 kHz to 1 GHz, in particular to measure samples at different depths with high resolution. The lateral resolution is somewhat smaller than with a conventional light microscope, while in general, the depth resolution far surpasses traditional microscopy. In practice, the sample is often scanned with a single transducer, and an image of the sample is generated point-by-point (SAM, scanning acoustic microscopy). The ultrasound microscopy is used in semiconductor technology, for example. In regards to the thin-layer technology, a plurality of semiconductor wafers are metallically soldered or otherwise connected. Connection solders and adhesives may vary in their properties. Also, additional dielectric layers may be applied thereto.

Density waves in the acoustic range of 20 kHz to 1 GHz are known as "ultrasound waves" or "ultrasonic waves". One uses ultrasound for microscopical examination.

Among others, ultrasound transducers are used which often comprise a piezoelectric element, provided with contact layers, and an electrical matching network. In "ultrasound waves", which are coupled-in by a single transducer through an immersion liquid, "HF" ("High Frequency") roughly refers to the frequency range greater than 20 MHz, and "UHF" ("Ultra High Frequency") roughly refers to the frequency range greater than 150 MHz.

Here, the frequency usually refers to a midhand frequency of an acoustic wave train generated by an electrical pulse through the transducer, which can be broad band or narrow band, depending on the application.

The frequency range of fluidically-coupled single transducers is to be distinguished from that in contact transducers or array transducers, in the case of which frequencies smaller than the ones already mentioned are referred to as "UHF".

The frequency value is likewise to be distinguished from that in electromagnetic waves, for which "UHF" refers to a frequency band in the radio wave range of 300 MHz to 3 GHz.

Frequently, spherically focusing ultrasonic lenses are used, for which a constant distance to the measurement object within a depth of field range is sought, in order to not have to measure in a de-focused manner, and thereby to be able to measure in high resolution.

In order to be able to robustly scan bonded semiconductor wafers or laminated single chips on an area of many square centimeters in such a manner through single acoustic transducers, at least several hundred micrometers distance between the transducer and the measuring object are provided in the industry as a rule.

The maximum resolution of spherically focusing fluidically-coupled HF or UHF single transducers for the measurement of bonded semiconductor wafer stacks then lies between 50 µm and 5 µm, for example, depending upon the coupling fluid used, the central frequency, the lens radius, and the scanned thickness. Occasionally, measurements will be made using a filtering electronics, for example using a Hilbert signal filter.

The maximum resolution is to be distinguished from the resolution, which is achieved in the measuring of samples in biology, for example, where one occasionally scans areas of only a few millimeters edge-length, and is able to measure very close to the measurement object through short focal lenses and high-resolution lenses; through the proximity to the object being measured, the ultrasound wave then remains the coupling medium which is, as a rule, highly damping in this frequency range for only a short period, and therefore even frequency ranges greater than 1 GHz can be used there, which are sometimes also referred to as hypersonics.

In order to be able to obtain artefact-free images of individual joining interfaces by means of fluidically-coupled single transducers through high-resolution ultrasound micrographics, the measuring software should be capable of reading a measuring signal (for example, a digitalized signal in an imagined A-scan plot) at any position (x, y) of an XY-scanner in such a manner that the correct time range for picking the signal is found dynamically.

Through variations in the connecting solder, in adhesive materials or through additionally formed dielectric layers, signals of different levels result in an imagined A-scale plot, which can move over the sample in the time range during the scan in the event that the wafer is slightly bent or tilted. In addition to such a response in the time range, the signal levels vary in general amongst themselves at various peaks during the scan. It is then elaborate to set up the measuring software in such a way using traditional methods (such as a simple surface signal triggering with a time gate constantly spanned in time shift, for example), in particular when various products are meant to be robustly measured with the same microscope, for example in the context of an inline volume production, that the correct measuring signal is picked up with high accuracy.

A measuring software had heretofore made it possible to utilize the signal peaks clearly discernible in the A-scan in generating an image, wherein the signal level of the selected signal among two or multiple signals at a particular position x, y determined a gray scale or color-value in the picture at that particular position. Also, it was precisely due to the parallel use of various solder- and adhesive technologies that undesired and false signal pick-ups occurred. As a result, various ultrasound microscopes were dedicatedly used in a product-specific manner, in order to avoid high chip rejection rates in a downstream automated image recognition software. There exists a need to be able to measure structural features such as joined interfaces of one or more bonded semiconductor wafers of constant thickness, in the context of semiconductor production volume, over the entire area by means of high-resolution ultrasound micrography with a single transducer as robustly and free of artefacts, particularly false triggers, as possible.

An object of the present invention consists of providing a method for the ultrasound microscopic measuring of semiconductor samples, which enables a more robust image generation also of different samples. In addition, among others, a computer program for the ultrasound microscopic measurement of semiconductor samples, a computer program product, and an ultrasound microscope are to be provided.

In the following embodiments, characteristics and their function in relation to possible embodiments are described. All features can be used independently of each other, or in combination with other described features. In addition, all characteristics can also be combined with one or multiple characteristics of another embodiment, or can be utilized with a combination of multiple embodiments, so far as a characteristic is not explicitly described as an alternative, or a combination is not explicitly excluded. Furthermore, equivalents and modifications which are not explicitly described, are also included in the embodiments without deviating from the scope of the method summarized in the claims for the ultrasound microscopic measurement of the semiconductor samples, the computer program for the ultrasound microscopic measurement of semiconductor samples, the computer program product, and the ultrasound microscope.

According to at least one embodiment, a method of ultrasound microscopically measuring of semiconductor wafers includes the following steps. For example, the method can be divided into two phases: the receiving of a measuring signal with an ultrasound microscope, and a subsequent evaluation of the measuring signal.

For receiving the measuring signal, a sample is first prepared. The sample comprises at least one layer of known thickness. The sample is fixed and is introduced into a medium which can conduct sound, or rather ultrasound. A suitable medium is water, for example.

Generally, the sample is a solid body, in which ultrasound waves may propagate. For example, semiconductor components (semiconductor samples) can be utilized as samples, which often comprise a layer structure. For example, thin layers of different materials, such as metallic, dielectric, and semiconducting materials are connected, soldered, or bonded to semiconductor components within the conjunction of thin layer technology. The thickness of such layers typically from a few micrometers up to a few nanometers. The structure of the sample, in particular a semiconductor sample, is determined by the manufacturer within the course of the development, or rather the production. Here, the layer thicknesses are thereby often defined or standardized within strict parameters. One example is the SEMI standard for wafers and semiconductor components. In other words, the thickness of layers is often a parameter, which can be known with great exactitude. This fact can in turn be utilized for the measurement of the sample by means of ultrasound microscopy.

A sonic transducer of an ultrasound microscope is moved to a position relative to the layer of the sample for receiving the measuring signal. For example, the sonic transducer (also referred to as transducer) is moved along two spatial directions x, y with the assistance of an X-Y image scanner (or X-Y scanner), or along three spatial directions x, y, z with the assistance of an X-Y-Z image scanner (or X-Y-Z scanner).

In a following step, ultrasound waves are produced and focused onto the position x, y of the sample. Ultrasound waves can be provided as pulses or as continual waves with a certain duration of time. For example, an ultrasound source with suitable control electronics can therefore be utilized as a rule as they are conventionally installed in ultrasound microscopes. The thereby-produced ultrasound waves have a high frequency from a few 10 MHz up to several 100 MHz, and are emitted by the sonic transducer. The generated ultrasound waves can be focused by means of a lens integrated into the sonic transducer or attached thereto.

As a result, a measuring signal is received. The ultrasound waves penetrate into the sample and are reflected, scattered, or absorbed in the inside of the sample.

Ultrasound waves reflected at the sample can be detected through the ultrasound microscope. For example, this is effected through the same sonic transducer and the lens. The measuring signal is a measurand of ultrasound waves reflected by the sample as a function of time.

The measuring signals are evaluated in the space of the Hilbert-filtered signals. However, the method can also be utilized for unfiltered signals, or it is possible to initially filter unfiltered signals, and subsequently to perform the following evaluation. Here and in the following, the term signal value also refers to the signal envelope, in particular. The signal amplitude refers in particular to the peak of the signal.

The received measuring signal is evaluated through the following steps. The evaluation can be carried out through a computer program on a measuring computer, for example, or through hardware such as a microcontroller.

First, signal values are identified in the measuring signal, whose signal amplitudes lie above a certain threshold signal value. The threshold signal value can be determined as desired by a user and generally depends on the respective measuring conditions, such as signal noise. For example, the threshold signal value can be set by a fixed value or dynamically to a percent value of the measuring signal amplitudes. Only signal values which lie above the threshold signal value are taken into consideration for the further evaluation.

The so-described method does not exclude that some signals will not be found. In order to therefore always have still as sufficient data as possible for a robust signal picking, pairs or combs are formed in all possible combinations from the identified signals in the following. The signal pairs or combs include two signal values, for example, which in turn each comprise a measuring time and a signal amplitude.

At least one time distance each is assigned for individual signal pairs formed in this manner or terminals composed of signal pairs in this manner, calculated from the start of the first signal to the end of the last signal. The measuring signal can, for example, be represented as the time course of the signal value, that is, in an A-scan plot. Peak signal values, or signal peaks have a time distance, which can be assigned to a reflection of ultrasound waves by an interface or a defect of the sample, for example.

In general, signal pairs can be formed from all signal values, whose signal amplitudes exceed the set threshold value, and therefore comprise a signal peak. The corresponding time distances can then be determined by means of permutations from all such signal pairs.

The time distances determined this way are compared with reference time distances, which are determined by the layers of the sample, which are known per se. For example, one of the layers has a known thickness and a sound velocity. The reference time distance can be determined from these parameters.

Finally, signal pairs or signal terminals are selected. The selection takes into account whether the comparison(s) of the particular time distances fulfill a comparison criterion with the reference time distance. If the signal pair fulfills the comparison criterion, then this signal pair is selected.

In one embodiment, for example, signal pairs are sorted by time in the order that the signal peaks temporally occur.

In the following, at least one of the signal values of the signal pair, e.g. the temporally later signal value of the signal pair, is selected for further evaluation. It is also possible, however, that the signal value that is temporally earlier or a combination of both signal values of the signal pair is/are selected and considered in an evaluation.

The selected signal value(s) is/are used to determine a representation value for graphical representation of the measuring signal. This can e.g. be effected by means of the assigned signal maximum in that the representation value is derived from the signal level and represents this level.

According to at least one embodiment, the comparative time distance is determined from a propagation time required by the ultrasound wave to travel a distance in the medium of the sample corresponding to the layer thickness of the sample. In some regard, a sample layer constitutes a finite distance which can be run-through by an ultrasound wave of the sample layer according to sound velocity. The time required to that end corresponds to the respective comparative time distance of the sample layer.

According to at least one embodiment, the method steps are repeated at different positions x, y of the sample. This way, multiple representation values are determined, each assigned to a position x, y.

Here, the z position is perpendicular to the wafer stack with respect to the focus on the respective layers, and is not or only slightly variated while the essentially planar scan takes place in the x, y direction, for example in order to react to a slight wafer bending due to different thermal expansion coefficients of previously relatively exactly bonded wafers and in order to be always able to measure in focus.

The representation values are then combined into a graphic illustration, e.g. a two-dimensional image of the sample. Measuring the signal maximum or the signal amplitude depending on the time at a position x or a position y corresponds to an A-scan, for example. A scanning, respectively a scan at multiple positions corresponds to a C-scan, for example, using conventional terms of ultrasonic microscopy.

According to at least one embodiment, repeating of the method steps takes place at different positions, in that the sonic transducer is displaced to the different positions by means of an image scanner of the ultrasound microscope and the sample is thus measured in parts or as a whole.

According to at least one embodiment, the measuring signal is received at each position x, y of the sample in the type of an A-scan. The measuring signals received at each position x, y of the sample are combined into a graphical representation of the sample in the type of a C-scan by means of the representation values.

According to at least one embodiment, the comparative criterion is fulfilled if a certain time distance of a signal pair is equal in value to the comparative time distance.

According to at least one embodiment, the comparative criterion is fulfilled if a certain time distance of a signal pair within a measuring uncertainty is equal in value to the comparative time distance. In contrast, multiple comparative criteria are satisfied if multiple time distances of multiple signal pairs are equal in value to the comparative time distances within a measuring uncertainty.

In this way, measuring uncertainties can be taken into account. The measuring uncertainties can e.g. be a fixed time interval of +/−2 ns, for example. Furthermore, it is possible for the measuring uncertainties to depend on the comparative time distance. The measuring uncertainty is at most 20%, in particular at most 10%, of the comparative time distance then, for example.

According to at least one embodiment, identification of one or multiple signal pairs is limited merely to a predefined time interval or gate. The time interval can take into account, for example, in which time distance the respective signal values are expected to be, for example. Time distances outside the time interval are not considered. This allows a simpler and faster evaluation, because not all signal values have to be considered.

According to at least one embodiment, the time values of the identified signals are written into a signal vector (or a signal sequence), in particular in a chronological sequence. For example, a first vector component corresponds to the earliest signal value, a second vector component corresponds to the signal value following in time, up to an n-th vector component, which corresponds to the signal value last in time. For determining the time distances, a signal signature vector (or a signature or a signature sequence) is formed, in which the components of the measuring vector, i.e. of the signal vector, are subtracted from one another component by component. These components of the vectors can be provided as digital values, for example.

According to at least one embodiment, a respective representation value represents a signal amplitude as a gray value and/or as a color value, e.g. for a false color representation. Suitable here are all ways of illustration by means of which an image can be generated. For example, a representation value may correspond to an analog or digital value that depends on the respective measuring signal.

According to at least one embodiment, the sample comprises a semiconductor sample, in particular a semiconductor sample connected or bonded in layers. The sample is produced layer by layer by means of thin film technology, for example.

According to at least one embodiment, defective regions of the sample are identified utilizing the representation value for graphical illustration of the measuring signal. Such a defective region can be a defect, for example, in the region of which two layers of the sample are incompletely connected to one another. If the sample is e.g. a semiconductor sample including a plurality of semiconductor chips arranged laterally next to one another, the defective region may impair one or multiple of these semiconductor chips. Semiconductor chips arranged in the defective region can then be rejected in a targeted manner. In particular the high lateral resolution of the present method allows to be able to particular exactly determine the defective regions, so that only semiconductor chips are rejected which are actually arranged in a defective region of the sample. Moreover, the described method is particularly robust and free of artefacts or false triggers, respectively. In this way, it can be ensured that, as far as possible, no regions are accidentally identified as being defective. The number of semiconductor chips rejected by mistake can thereby be kept particularly low.

According to at least one embodiment, the sample comprises multiple layers each with a known thickness. Each of these layers defines a respective comparative time distance of the respective layer, which is determined by the known thickness of the layer. The evaluation of the measuring signal additionally comprises the following steps then.

The determined time distance(s) are compared to the respective comparative time distance of the different layers. If the comparison fulfills a comparative criterion, which is characteristic for in each case one of the layers, again the signal value later in time of the underlying signal pair is selected. The selected signal value is used then for determining a representation value for graphical illustration of the measuring signal.

According to at least one embodiment, a computer program for ultrasound microscopic measuring of semiconductor wafers includes a computer program code. The computer program code is configured to cause or control a control unit of an ultrasound microscope to execute the method steps of receiving a measuring signal according to the above.

Furthermore, the computer program code is configured to cause a measuring computer of the ultrasound microscope to execute the method steps of evaluation of the measuring signal according to the above. This takes place by interaction with a user, or automatically, for example.

According to at least one embodiment, a computer program product includes the computer program and a computer-readable medium on which the computer program is stored. The computer-readable medium is e.g. a data carrier or a memory medium, which is fixedly or exchangeable connected to an ultrasound microscope or to the control unit thereof or the measuring computer, for example.

According to at least one embodiment, an ultrasound microscope includes a sonic transducer, an xy-image scanner, a control unit and a measuring computer.

The transducer includes an ultrasound source capable of generating ultrasound waves. The image scanner is configured to displace the transducer at positions relative to the sample. The control unit is adapted to execute the method steps of receiving a measuring signal. The measuring computer is further configured to execute the method steps of evaluating the measuring signal. Measuring computer and control unit can be implemented by separate components or by a computing unit such as a computer having corresponding control electronics, e.g. microcontrollers. The ultrasound microscope comprises suitable means to read the computer-readable medium and to execute the computer program, for example.

The method presented here for ultrasound measuring of semiconductor samples as well as the computer program for ultrasound measuring of semiconductor samples, the computer program product and the ultrasound microscope allow a more robust measurement, respectively image generation, even of different samples. In particular, the signal values, respectively signal peaks, e.g. in the A-scan, can be identified and reliably be assigned to a layer of the sample. Inter alia, it is made use of the fact that the known layer thicknesses may serve as a parameter, also to derive the sequence of time differences of successive signals. This sequence in the measuring signal can be interpreted as a fingerprint, respectively signature of a certain wafer stack and be used for temporally-adapted signal picking. In this way, an image of the sample or of the layers thereof can be generated, which is largely free of artifacts.

One problematic aspect of the ultrasound microscopy and its use in a semiconductor volume production, in particular if varying product types with high-resolution measurement are measured by way of single transducers or also by multi-transducer systems, lies with the correct and robust picking of the A-scan signal containing the product information originating from the measuring sample if the signal is extracted from the A-Scan from false time ranges, critical slip or an over-reject is very likely to occur.

The proposed signal signature consisting of the time differences of the signal values or signal peaks, is constant with high precision due to the prevailing SEMI standards for wafer thicknesses in a semiconductor volume production, and therefore a robust product specific. Time differences are largely independent of impacts such as beam symmetry or beam pressure of the transducer and also largely depending on the fact how intense the adherence of neighboring layers in a wafer stack is.

Compared to alternative methods, which in part merely trigger to a measuring peak depending on the reaching of a threshold value, in rather complex stacks, the option of recognizing multiple characteristic time differences and utilizing them as supports for correct signal picking is the potential of the proposed method. In general, the following is true: the more complex the geometry of the wafer stacks to be measured, the more powerful becomes the proposed method of signal picking compared to the mentioned simple standard methods of signal picking.

A robust signal picking is advantageous for the different reasons. Whether an ultrasound measurement is robust for a large product range is decisive, inter alia, for the actual situation of facility dedications becoming necessary and therefore the cost of ownership of the facilities and measuring capacities of the overall production. Furthermore, achievable product quality is also a matter of reliable test methods. Whether ultrasound measuring is robustly functional for a product is decisive for the slip rate and therefore decisive for whether this kind of non-destructive measuring can be applied and considered for a product technology at all.

In the following, the invention will be explained in greater detail by means of exemplary embodiments, wherein the individual features of the independent claims can also be essential for the invention in other combinations and are understood to be disclosed in this form; furthermore, there is no individual discrimination between the various categories of the claims.

Like, equivalent or similar elements are indicated with the same reference characters throughout the figures.

The figures and the size ratios of the elements illustrated in the figures amongst one another are not to be considered as being true to scale. Rather, individual elements and in particular layer thicknesses can be illustrated in an exaggerated size for the purpose of a better illustration and/or a better understanding.

Figure 1:
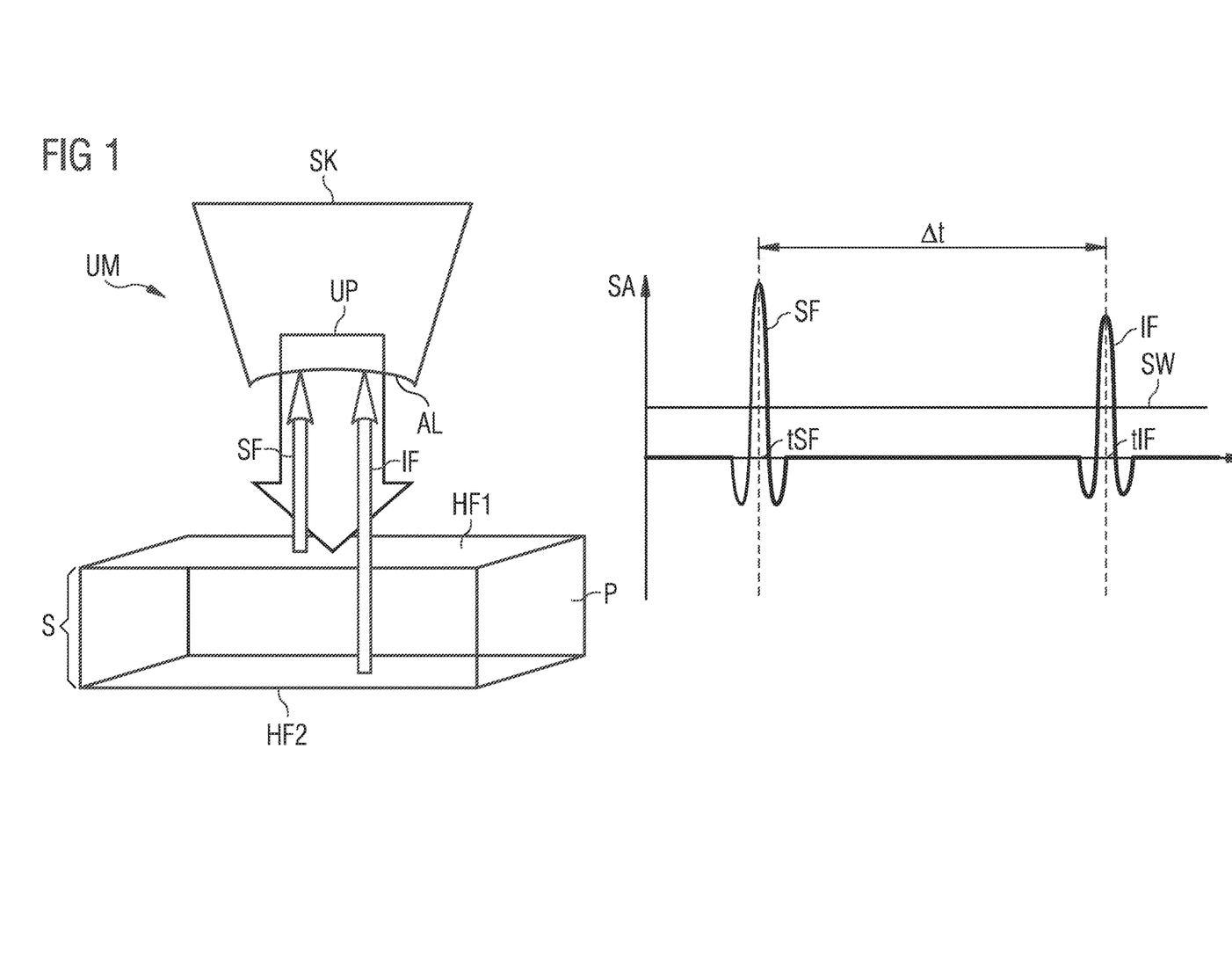
FIG. 1 an exemplary ultrasound microscopy measuring of a semiconductor sample.

FIG. 1 shows an exemplary microscopic ultrasound measuring of a semiconductor sample. The left side of the illustration shows a transducer SK of an ultrasound microscope UM and a semiconductor sample P. The right side of the illustration shows an exemplary measuring signal.

The transducer SK of the ultrasound microscope UM is positioned at a position X, Y, for example. The sample P is fixed below the transducer SK. This sample is e.g. a semiconductor sample having one or even multiple layers S. However, only one layer is discussed for illustrating the proposed measuring principle.

High-frequency electric signals are produced by means of an ultrasound source (not shown). Depending on the application, short high-frequency electric signals having frequencies of 5 MHz to 500 MHz are produced and coupled into the transducer SK (in this case: single transducer). Here, the transducer SK comprises e.g. a piezoelectric crystal which is configured to produce high-frequency ultrasound waves or ultrasound pulses UP with a duration from 10 ns to several 100 ns from the high frequency electric signals. The transducer SK has an acoustic lens AL connected thereto, focusing the ultrasound waves or ultrasound pulses UP onto the sample. To that end, the transducer SK having the lens AL and the sample P are preferably introduced into a coupling medium such as water. Here, the coupling medium promotes the transmission of the ultrasound waves to the sample.

The ultrasound waves are reflected on different interfaces of the sample p, respectively on its layers S, and are at least in part reflected back into the transducer SK as ultrasound echo. When configured as a single transducer, the ultrasound echo is converted into electrical signals by the transducer SK again, which are detected by a receiver as a measuring signal in a time-resolved manner. A measuring signal derived this way, which is derived at a fixed position (x, y) of the transducer SK, is also referred to as A-scan.

FIG. 1 shows two echoes drawn on different interfaces. One the one hand, a surface signal SF reflected on a main surface HF1 of the sample P. Furthermore, a joining interface signal IF is indicated, which is reflected on a further main surface HF2 of the sample P. This further main surface is e.g. a joining interface in a semiconductor sample, on which different layers are connected, for example metal-soldered.

A resulting measuring signal is indicated on the right side of FIG. 1. Here, the individual signal values of the measuring signal are pairs of a signal amplitude SA and the time t. Accordingly, signal amplitudes are detected as a function of time. For example, the time t of the ultrasound echo is measured relative to the emission of the ultrasound waves or another suitable reference is selected. The time is usually indicated in nanoseconds ns. The signal amplitudes SA are for example standardized, e.g. to the highest existing amplitude value or another arbitrary comparative value. Furthermore, a threshold value SW is indicated in the illustration. This value can be set arbitrarily by a user and is 10%, 20%, 30%, 40% or 50% of a comparative amplitude, for example, such as the highest existing amplitude value or also any other comparative value.

In FIG. 1, the surface signal SF and the joining interface signal IF can be discerned at different points in time tSF or tIF, respectively. The time distance $\Delta t = tIF - tSF$ is a characteristic value, which is a measure for the layer thickness of a layer S of the sample P. If, in turn, the layer thickness is known, the signal amplitudes or signal peaks can be identified by means of their time distance. In the following, this measuring principle is explained in greater detail by means of exemplary measuring results.

Figure 2:
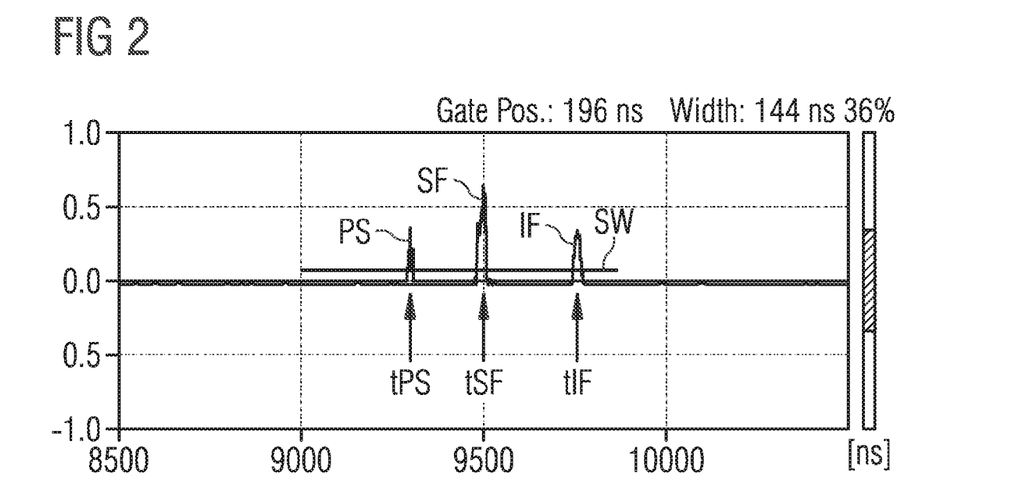
FIG. 2 an exemplary first measuring result of a first measuring of a semiconductor sample according to the proposed principle, FIG. 3 an exemplary second measuring result of a measuring of a semiconductor sample according to the proposed principle, FIG. 4 a third exemplary measuring result of a measuring of a semiconductor sample according to the proposed principle, FIG. 5 a fourth exemplary measuring result of a measuring of a semiconductor sample according to the proposed principle.

FIG. 2 shows a first exemplary measuring result of a measuring of a semiconductor sample according to the proposed principle. The illustration shows a first measuring signal, which was generated by means of ultrasound waves (ultrasound echoes) reflected on a sample by means of a detector of an ultrasound microscope.

The example shown illustrates the origins of various echo signals of a transducer SK typically visible in an A-scan, which is typically used both for the emission and detection of ultrasound waves (single transducer). A metal-bonded two-layer stack of semiconductor materials is used as sample by way of example. The proposed method is not limited to this type of sample, however.

A calotte signal PS (caused by an echo in the transducer itself), a surface signal SF and a joining interface signal IF are visible at different points in time tPS, tSF or tIF, respectively. These points in time result in different time distances, i.e.:

$$\Delta t1 = tSF - tPS = 130 \text{ ns},$$

$$\Delta t2 = tIF - tSF = 167 \text{ ns, and}$$

$$\Delta t3 = \Delta t1 + \Delta t2 = 297 \text{ ns}.$$

These calculated time distances form the components of a signature vector and are characteristic for the examined sample. In contrast, material parameters and layer thicknesses are known with high exactitude from the development, respectively production of the sample, such that the components of the signature vector or the characteristic time distances can be calculated and are therefore known.

The layer thickness is standardized, for example, and the speed of sound inside the layer is known as well. This allows calculating the time that it takes for the sound to pass through the layer. This corresponds to the characteristic time distance for the respective layer then. In the measuring signal, this is expressed by the two echoes, respectively signal peaks, which are at a distance from one another by exactly the characteristic time distance.

By comparing the calculated comparative distance to the measured distance, the echoes, respectively signal peaks, can be unambiguously assigned. This is done by a suitable comparative criterion, which for example also considers measuring imprecisions. Here, a comparative criterion also considers the scan uncertainty depending on the microscope, which typically depends on the scanning rate. For example, the scanning rate is 0.5 MS/s, 1 MS/s or 10 MS/s and the comparative criterion could test the equality of time distance and comparative time distance to +/−2 nanoseconds, for example.

Finally, a gray scale signal of the ultrasound echo is determined from the signal amplitude or the signal level of the joining interface signal IF. If one now scans over the sample line by line with the ultrasound transducer with an xy scanner, one subsequently obtains information about the different regions of the sample and is able to compute an image therefrom. This image often appears as a gray scale image or false color image.

Figure 3:
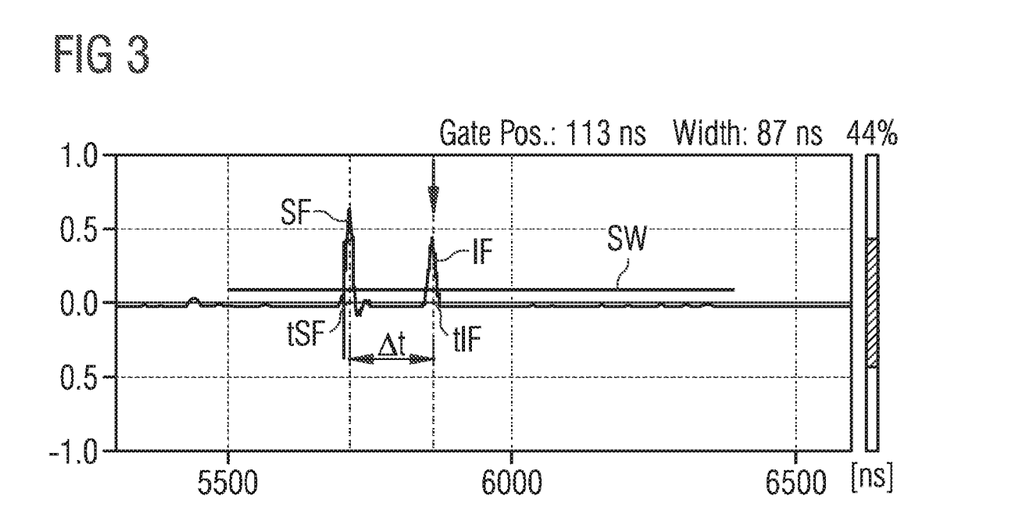

FIG. 3 shows an exemplary second measuring result of a measuring of a semiconductor sample according to the proposed principle.

Just as well, in this example an ultrasound echo is plotted, just as in FIG. 2, showing a metal-soldered layer stack. Only the surface signal SF and the joining interfaces signal IF can be discerned in the measuring signal as distinctive signal peaks, i.e. as elevations above a virtual signal threshold with the set threshold value at the timings tSF and tIF. These timings result in different time distances, in other words $$\Delta t = tIF - tSF = 150 \text{ ns}.$$

Just as well, in this case the time distance $\Delta t = 150$ ns is a characteristic signature value of the product to be measured, and can be considered in finding a correct gate position (measuring time interval) and for assigning the signal amplitudes to the surfaces, respectively structures of the sample, as well as for a representation value for the joining interfaces.

In the example shown, the measuring rule is e.g. as follows: Search a signal pair having the time distance 150 ns, which exceeds a signal threshold SW (e.g. 30%) on both sides and utilize the signal level of the second signal for gray scale determination of the corresponding pixel (representation value according to a position x, y on the sample) in a C-scan plot.

In addition, it is to be noted that the signal level ratio of the signal peaks among one another can also be of informative nature, but that such ratios are not reliable compared to characteristic time distances, however. The signal level ratios rather depend e.g. on variable bond qualities laterally to a stack surface (e.g. of a wafer) of the layer sample.

Figure 4:
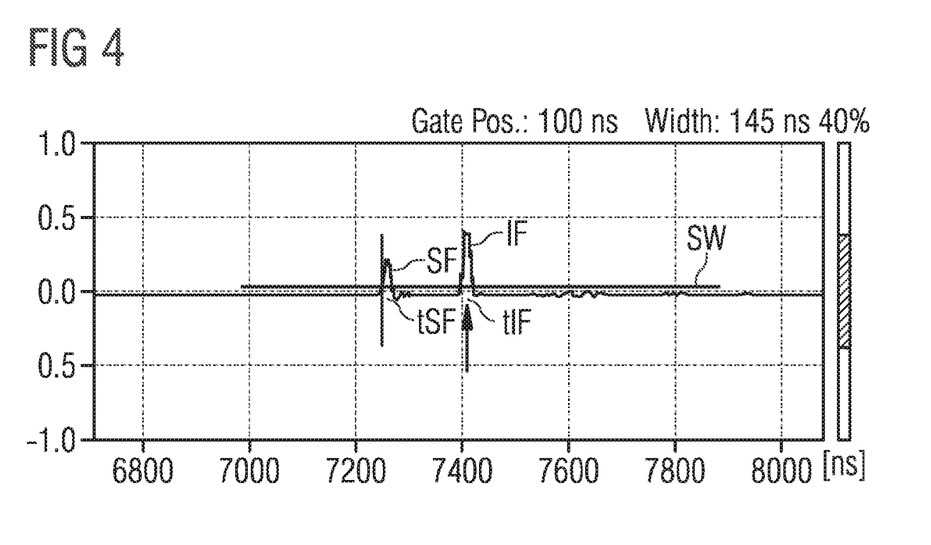

FIG. 4 shows a third exemplary measuring result of a measuring of a semiconductor sample according to the proposed principle.

This example shows a characteristic time distance or a signature of $\Delta t=140$ ns. Here, the signal ratio is inverted compared to the preceding examples, which can, however, only rarely be used to improve the signal picking since this signal does not necessarily have to unambiguously originate from a joining interface layer.

Figure 5:
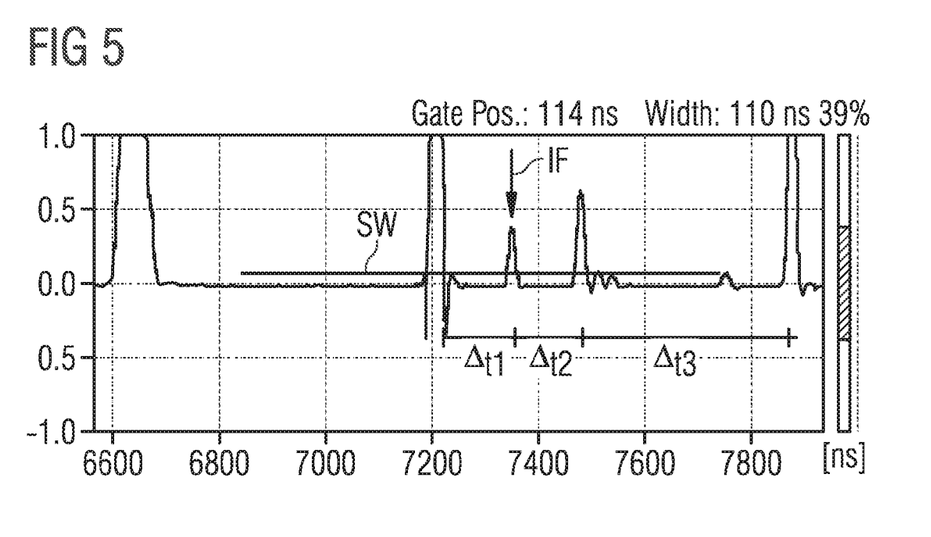

FIG. 5 shows a fourth exemplary measuring result of a measuring of a semiconductor sample according to the proposed principle.

This example shows a sample having more than one layer. Here, the characteristic time distances are $\Delta t1=133$ ns, $\Delta t2=123$ ns, and $\Delta t3=370$ ns.

From these, further possible time distances result by combination or permutation:

$\Delta t4=\Delta t1+\Delta t2=256$ ns, $\Delta t5=\Delta t2+\Delta t3=493$ ns, as well as $\Delta t6=\Delta t1+\Delta t2+\Delta t3=626$ ns.

In general, according to this scheme and with a number of n detected time differences, mathematically one obtains $(n-1)!$ individual characteristic time distances as A-scan components in the signature vector.

LIST OF REFERENCE CHARACTERS

AL acoustic lens
HF1 main surface
HF2 main surface
IF joining surface signal
KS calotte signal
P sample
S layer
SA signal amplitude
SF surface signal
SK transducer
t time
$\Delta$t time distance
tIF time value joining surface signal
tSF time value surface signal
UM ultrasound microscope
UP ultrasound pulse

The invention claimed is:

1. Method for the ultrasound microscopic measurement of semiconductor wafers, wherein receiving of a measuring signal includes the following steps:
   providing a sample (P), wherein the sample comprises at least one layer (S) with a known thickness,
   moving a transducer (SK) of an ultrasound microscope (UM) to a position x, y with respect to the layer (S) of the sample (P),
   generating and focusing ultrasound waves onto the position x, y of the sample (P),
   receiving the measuring signal from ultrasound waves reflected at the sample (P) as a function of time, and
   evaluating the measuring signal, wherein the following steps are carried out:
   identifying signal values in the measuring signal, whose signal amplitudes (SA) lie above a signal threshold value (SW),
   forming one or multiple signal pairs from the identified signal values,
   determining a time distance ($\Delta$t) between the chronologically successive signal amplitudes (SA) of the signal values from every signal pair formed,
   comparing, for each signal pair formed, the determined time distance ($\Delta$t) with a reference time distance, which is determined through the known thickness,
   selecting, for each signal pair formed, at least one signal value of the signal pair, provided that the comparison for the signal pair fulfills a comparison criterion, and
   utilizing the selected signal values for determining a representation value for a graphical representation of the measuring signal.

2. Method according to claim 1,
   wherein a chronologically later signal value of the signal pair is selected.

3. Method according to claim 1,
   wherein the reference time distance is determined from a propagation time required by an ultrasonic wave to cover a path length in the medium of the sample (P) corresponding to the thickness of the sample (P).

4. Method according to claim 1,
   wherein the method steps are repeated at different positions x, y of the sample (P) and the thereby determined representation values are combined into a graphical representation of the sample (P).

5. Method according to claim 1,
   wherein for repeating at different positions x, y of the sample (P), the transducer (SK) is moved to the different positions x, y by means of an XY-image scanner of the ultrasound microscope (UM) and the sample (P) is thereby measured completely or in parts.

6. Method according to claim 1, wherein at each position x, y of the sample (P), the measuring signal is received in the type of an A-scan, and measuring signals received at each position x, y of the sample (P) are combined through the representation values into a graphical representation of the sample (P) in the type of a C-scan.

7. Method according to claim 1,
   wherein the comparison criterion is satisfied if a certain time distance of a signal pair is equal in value to the reference time distance.

8. Method according to claim 1,
   wherein the comparison criterion is fulfilled if, within a measuring uncertainty, a particular time distance of a signal pair is equal in value to the reference time distance.

9. Method according to claim 1,
wherein the identification of signal pairs is limited to only a predetermined time distance.

10. Method according to claim 1,
wherein time values of the identified signal values are written in a signal vector in a chronological sequence, and a signature vector is formed to determine each time distance by subtracting the components of the signal vector from one another, component by component.

11. Method according to claim 1,
wherein the representation value represents a signal amplitude as a gray value and/or as a color value.

12. Method according to claim 1,
wherein the sample (P) comprises a semiconductor sample, in particular a semiconductor sample connected or bonded in layers (S).

13. Method according to claim 1,
wherein defective areas of the sample are identified on the basis of the representation value for the graphical representation of the measuring signal.

14. Method according to claim 1, wherein
the sample (P) comprises several layers each with a known thickness,
each layer defines a reference time distance, which is determined by the known thicknesses of the respective layer for each sample (P) of a plurality of samples (Ps), and
the evaluation of the measuring signal for the layers takes place, comprising the further steps of:
   comparing the determined time distance with the reference time distances of layers (Ss),
   selecting at least one signal value, for example a temporally-later signal value of the signal pair, provided that the comparison fulfills the comparison criterion,
   wherein in each case one comparison criterion is characteristic of one of the layers (Ss), and
   utilizing the selected signal values for the determination of representation values for the graphical representation of the measuring signal.

15. A non-transitory computer readable medium storing instructions that when executed by a computing system cause the computing system to perform the operations for ultrasonic microscopic measurement of semiconductor wafers, the operations comprising, causing a control unit of an ultrasonic microscope (UM) to execute the method steps of receiving the measuring signal according to claim 1 and/or causes a measuring computer of the ultrasonic microscope (UM) to execute the method steps of evaluating the measuring signal according to claim 1.

16. Ultrasound microscope, comprising:
   a transducer (SK) including an ultrasound source for providing an ultrasound wave,
   an xyz image scanner for displacing the transducer (SK) to a position x, y, z of a sample (P), a control unit, which is configured to execute method steps for receiving a measuring signal, wherein the receiving of the measuring signal includes the following steps:
providing the sample (P), wherein the sample comprises at least one layer (S) with a known thickness,
moving the transducer (SK) to a position x, y with respect to the layer (S) of the sample (P),
generating and focusing ultrasound waves onto the position x, y of the sample (P),
receiving the measuring signal from ultrasound waves reflected at the sample (P) as a function of time, and
a measuring computer, which is configured to execute method steps for the evaluation of the measuring signal, wherein the evaluation of the measuring signal includes the following steps:
identifying of signal values in the measuring signal, the signal amplitudes (SA) of which lie above a signal threshold value (SW),
forming one or more signal pairs from the identified signal values,
determining a time distance ($\Delta t$) between the chronologically successive signal amplitudes (SA) of the signal values from each formed signal pair,
comparing, for each signal pair formed, the determined time distance ($\Delta t$) with a reference time distance, which is determined through the known thickness of the sample,
selecting a temporally later signal value of each signal pair, provided that the comparison for the signal pair fulfills a comparison criterion, and
utilizing the selected signal values for determining a representation value for a graphical representation of the measuring signal.

17. Ultrasound microscope according to claim 16,
wherein the control unit and/or the measuring computer are further configured to execute the method of claim 1.

18. Ultrasound microscope according to claim 16,
wherein the ultrasound microscope comprises means to execute the computer program according to claim 15.

* * * * *